(12) United States Patent
de Araujo et al.

(10) Patent No.: US 9,306,694 B2
(45) Date of Patent: *Apr. 5, 2016

(54) CLOCK SIGNAL SYNCHRONIZATION AMONG COMPUTERS IN A NETWORK

(75) Inventors: Daniel N. de Araujo, Cedar Park, TX (US); James T. Hanna, College Station, TX (US); James O. Nicholson, Pflugerville, TX (US); Bruce J. Wilkie, Georgetown, TX (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 212 days.

This patent is subject to a terminal disclaimer.

(21) Appl. No.: 13/448,785

(22) Filed: Apr. 17, 2012

(65) Prior Publication Data

US 2012/0203933 A1 Aug. 9, 2012

Related U.S. Application Data

(63) Continuation of application No. 11/733,432, filed on Apr. 10, 2007, now Pat. No. 8,199,695.

(51) Int. Cl.
*H04J 3/06* (2006.01)
*H04L 7/00* (2006.01)

(52) U.S. Cl.
CPC ............ *H04J 3/0688* (2013.01); *H04J 3/0658* (2013.01); *H04L 7/0008* (2013.01)

(58) Field of Classification Search
CPC ..... H04J 3/0635; H04J 3/0638; H04J 3/0658; H04J 3/0676; H04L 7/0008; H04L 7/0012

USPC ................... 370/350; 375/356, 357, 358, 362
See application file for complete search history.

(56) References Cited

U.S. PATENT DOCUMENTS

| | | | | |
|---|---|---|---|---|
| 3,940,558 | A * | 2/1976 | Gabbard et al. | ............... 375/356 |
| 5,737,587 | A | 4/1998 | Leung et al. | |
| 6,081,844 | A | 6/2000 | Nowatzyk et al. | |
| 6,163,551 | A | 12/2000 | Wolf | |
| 6,246,738 | B1 | 6/2001 | Acimovic et al. | |
| 6,317,475 | B1 * | 11/2001 | Kasurinen | ...................... 375/356 |
| 6,324,586 | B1 | 11/2001 | Johnson | |

(Continued)

OTHER PUBLICATIONS

Office Action, U.S. Appl. No. 11/733,432, Feb. 4, 2010, pp. 1-18.

(Continued)

*Primary Examiner* — Brandon Renner
*Assistant Examiner* — Scott M Sciacca
(74) *Attorney, Agent, or Firm* — Edward J. Lenart; Katherine S. Brown; Kennedy Lenart Spraggins LLP

(57) ABSTRACT

Methods, apparatus, and computer program products are disclosed for clock signal synchronization among computers in a network, including designating, as a primary clock signal for all the computers in a network, a clock signal from one of the computers in the network; providing the primary clock signal, simultaneously and in parallel, from the computer whose clock signal is designated as the primary clock signal to all the other computers in the network; and providing the primary clock signal, simultaneously and in parallel, from each computer in the network to all computers in the network through multiplexers and phase locked loops, with the primary clock signal locked in phase across all the computers by a phase locked loop on each computer.

19 Claims, 9 Drawing Sheets

(56) References Cited

U.S. PATENT DOCUMENTS

| | | | |
|---|---|---|---|
| 6,341,149 B1* | 1/2002 | Bertacchini et al. | 375/356 |
| 6,356,212 B1 | 3/2002 | Lyons et al. | |
| 6,618,455 B1 | 9/2003 | Maeda et al. | |
| 6,765,863 B1* | 7/2004 | Wakimoto et al. | 370/218 |
| 6,972,998 B1 | 12/2005 | Gibson et al. | |
| 7,003,064 B2 | 2/2006 | Drerup et al. | |
| 7,043,655 B2 | 5/2006 | Wu | |
| 7,512,728 B2 | 3/2009 | Tseng | |
| 7,636,411 B2 | 12/2009 | Canagasaby et al. | |
| 2001/0005361 A1 | 6/2001 | Lipsanen | |
| 2003/0034820 A1* | 2/2003 | Starr et al. | 327/292 |
| 2003/0128720 A1* | 7/2003 | Jones | 370/516 |
| 2004/0073698 A1* | 4/2004 | Harter et al. | 709/236 |
| 2005/0276255 A1* | 12/2005 | Aiello et al. | 370/348 |
| 2006/0039347 A1* | 2/2006 | Nakamura et al. | 370/350 |
| 2006/0245453 A1* | 11/2006 | Bedrosian | 370/503 |
| 2007/0086487 A1* | 4/2007 | Yasuda et al. | 370/503 |
| 2008/0144668 A1* | 6/2008 | Hall et al. | 370/503 |
| 2008/0256262 A1 | 10/2008 | de Araujo | |

OTHER PUBLICATIONS

Final Office Action, U.S. Appl. No. 11/733,432, Jul. 21, 2010, pp. 1-16.
Office Action, U.S. Appl. No. 11/733,432, Mar. 18, 2011, pp. 1-17.
Final Office Action, U.S. Appl. No. 11/733,432, Sep. 15, 2011, pp. 1-5.
Notice of Allowance, U.S. Appl. No. 11/733,432, Feb. 10, 2012, pp. 1-6.

* cited by examiner

CLOCK SIGNAL SYNCHRONIZATION AMONG COMPUTERS IN A NETWORK

CROSS-REFERENCE TO RELATED APPLICATION

This application is a continuation application of and claims priority from U.S. patent application Ser. No. 11/733,432, filed on Apr. 10, 2007.

BACKGROUND OF THE INVENTION

1. Field of the Invention

The field of the invention is data processing, or, more specifically, methods, apparatus, and products for clock signal synchronization among computers in a network.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated systems have evolved to take advantage of the higher performance of the hardware, resulting in computer systems today that are much more powerful than just a few years ago.

One of the areas in which considerable progress has been made is in scalable, synchronous operations among multiple computers. A 'switched fabric,' such as Fibre Channel or InfiniBand™, for example, can connect many devices through high-speed interconnections, so that the separate computers can in effect operate synchronously almost as a single machine. Switched fabric networks support redundant paths between multiple devices, forming a mesh network with devices being on the 'edges' of the mesh. One of the advantages of this topology is failover, meaning that in case one link breaks or a switch is out of order, communications among machines in the network can traverse alternate paths. Another advantage of such a topology is scalability, that more connections can be added as the number of endpoints increases so the route length (and thus, latency and throughput) can remain constant for point-to-point communications among the individual machines connected to the network. Scalable computing relies on building blocks that can operate independently. When operating in a multi-node, scaled environment, the difference in clock frequency among the various building block nodes impose additional latency to compensate for the varying offset frequency when communicating among the nodes and retiming the data for the local clock domain. While elastic buffers and asynchronous operation support this multi-frequency node communication, such operations require cumbersome additional logic and latency-management operations to provide adequate buffering and retiming of high speed signals among computers in such networks.

SUMMARY OF THE INVENTION

Methods, apparatus, and computer program products are disclosed for clock signal synchronization among computers in a network, including designating, as a primary clock signal for all the computers in a network, a clock signal from one of the computers in the network, where each computer in the network includes a clock signal generator having as an output a clock signal capable of coordinating operations among the computers in the network and also capable of interconnection to each of the other computers through a multiplexer in each computer and a narrow-bandwidth PLL in each computer; providing the primary clock signal, simultaneously and in parallel, from the computer whose clock signal is designated as the primary clock signal to all the other computers in the network; and providing the primary clock signal, simultaneously and in parallel, from each computer in the network to all computers in the network through the multiplexers and the PLLs, with the primary clock signal locked in phase across all the computers by the PLL on each computer.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
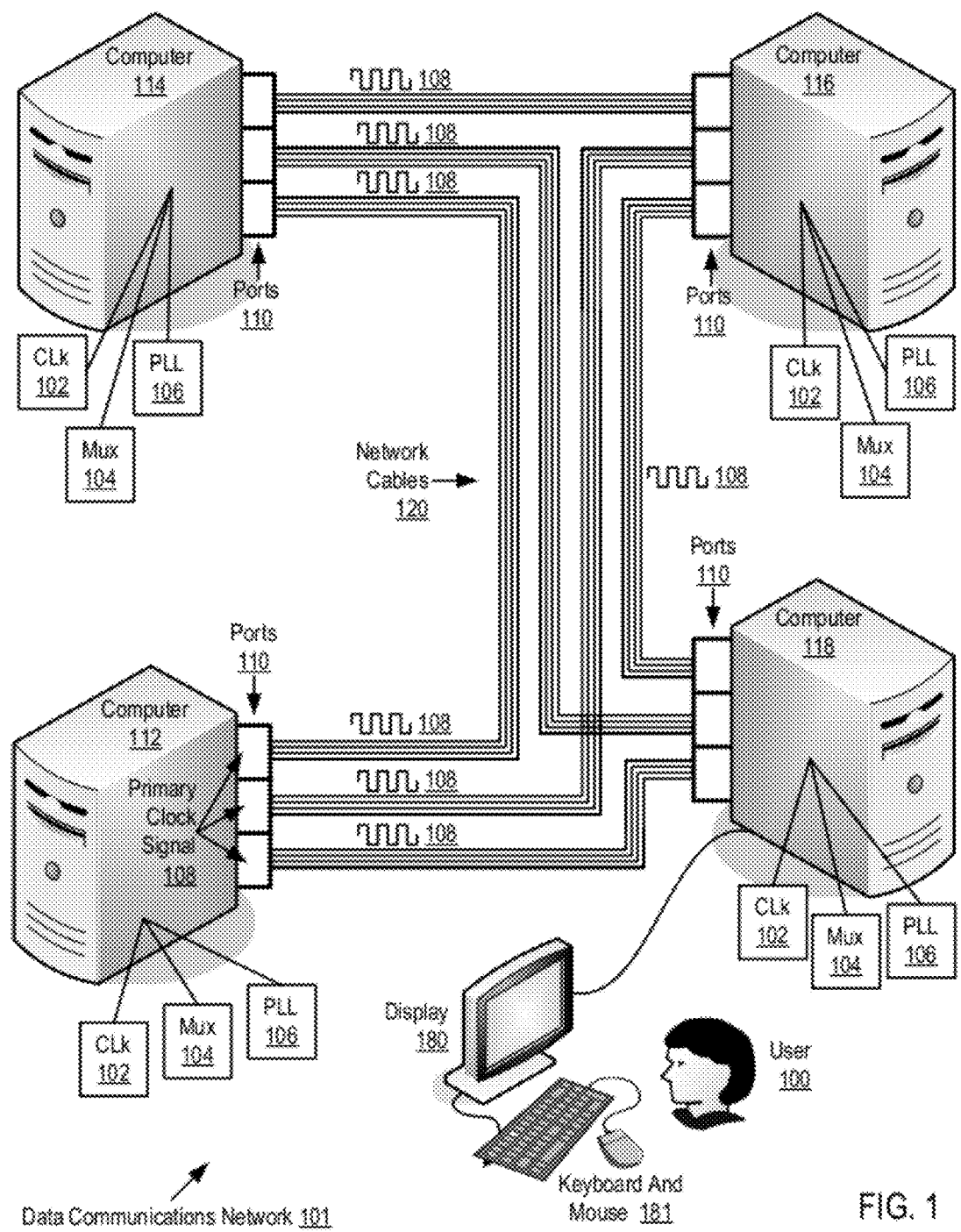
FIG. 1 sets forth a network diagram illustrating an exemplary system for clock signal synchronization among computers in a network according to embodiments of the present invention.

Exemplary methods, systems, and products for clock signal synchronization among computers in a network according to embodiments of the present invention are described with reference to the accompanying drawings, beginning with FIG. 1. FIG. 1 sets forth a network diagram illustrating an exemplary system for clock signal synchronization among computers in a network according to embodiments of the present invention. The exemplary system of FIG. 1 includes four computers (112, 114, 116, 118) connected together through a combination of data communications ports (110) and network cables (120) so as to form a data communications network (101). Whether the network is implemented as a switched fabric or a more traditional hierarchical network, such as an Internet Protocol ('IP') network, is not a limitation of the present invention. In fact, in the current art as reflected, for example, in the Internet standard RFC 4172, fibre channel fabric functionality can be implemented over an IP network. Data communications routers and fabric switches that might further characterize the network, therefore, are not illustrated expressly in the example system of FIG. 1, although readers will recognize that such routers and switches may be implemented within each computer or within the data communications ports.

In the example of FIG. 1, each computer (112, 114, 116, 118) in the network (101) includes a clock signal generator (102) having as an output a clock signal (108) capable of coordinating operations among the computers in the network and also capable of interconnection to each of the other computers through a multiplexer (104) in each computer and a narrow-bandwidth PLL ('PLL') (106) in each computer. A typical bandwidth for the narrow-bandwidth PLLs (106) is about 1 to 10 hertz, providing PLLs that are slow to change frequency upon losing a lock, thereby providing stable, low jitter clock signal synchronization across all the computers in the network.

Although this specification is primarily concerned with synchronous operations among computers in a network, there is no requirement that such computers operate synchronously at all times. Computers comprising such a network may be powered up, for example, for individual, asynchronous operations and later switched to synchronous operations.

The system of FIG. 1 operates generally to synchronize a clock signal among computers in a network according to embodiments of the present invention by designating, as a primary clock signal for all the computers in the network, a clock signal from one of the computers in the network. In this example, the clock signal from computer (112) is designated as the primary clock signal. One of the computers (118) in this example provides console functions to a user (100) through a user interface represented by a computer display (180) and a keyboard and mouse (181). The user (100) may instruct all the computers (112, 114, 116, 118), either upon powering up or later when switching from asynchronous to synchronous operations, through the user interface and data communications protocol messages, which of the computers is designated to provide the primary clock signal. The computer designated to provide the primary clock signal sets its multiplexer to delivery the clock signal from that computer's clock signal generator. The other computers in the network set their multiplexers to deliver the primary clock signal from one of their data communications ports rather than from their clock signal generators. In this way, only the clock signal from the clock signal generator of the computer designated to provide the primary clock signal is distributed through the network as the primary clock signal.

The system of FIG. 1 provides the primary clock signal (108), simultaneously and in parallel, from the computer (112) whose clock signal is designated as the primary clock signal to all the other computers in the network. Providing the primary clock signal (108), simultaneously and in parallel, from the computer (112) whose clock signal is designated as the primary clock signal to all the other computers (114, 116, 118) in the network means that every internal, secondary clock signal in all the computers in the network can be synchronized with the primary clock signal from the computer (112) whose clock signal is designated as the primary clock signal. The system of FIG. 1 also provides the primary clock signal (108), simultaneously and in parallel, from each computer in the network to all computers in the network through the multiplexers and the PLLs, with the primary clock signal locked in phase across all the computers by the PLL on each computer. The data communications ports in this example are bidirectional, so that each port supports an outgoing instance of the primary clock signal and an incoming instance of the primary clock signal.

The system of FIG. 1 provides the primary clock signal (108), simultaneously and in parallel, from each computer in the network to all computers in the network through the multiplexers and the PLLs, with the primary clock signal locked in phase across all the computers by the PLL on each computer means that each computer in the network typically has three instances of the primary clock signal present on the inputs of its multiplexer. The multiplexer is set to deliver one of these clock signals to a narrow-bandwidth PLL and then to internal, secondary clock circuitry. If the source of any particular instance of the primary clock signal fails, the narrow-bandwidth PLL receiving that signal will detect a loss of lock and begin to drift slowly away from the lock frequency towards its natural frequency. Because the narrow-bandwidth PLL will drift only very slowly in frequency and phase, it will develop very little phase error before control logic in the computer can detect the loss of lock and replace the lost primary clock signal on the input of the PLL by switching its multiplexer to delivery another instance of the primary clock signal from one of the other inputs of the multiplexer to the PLL.

The arrangement of computers and other devices making up the exemplary system illustrated in FIG. 1, as well as the number of computers in the example network of FIG. 1, are for explanation, not for limitation of the invention. Data processing systems useful according to various embodiments of the present invention may include additional computers, servers, routers, other devices, hierarchical network architectures, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
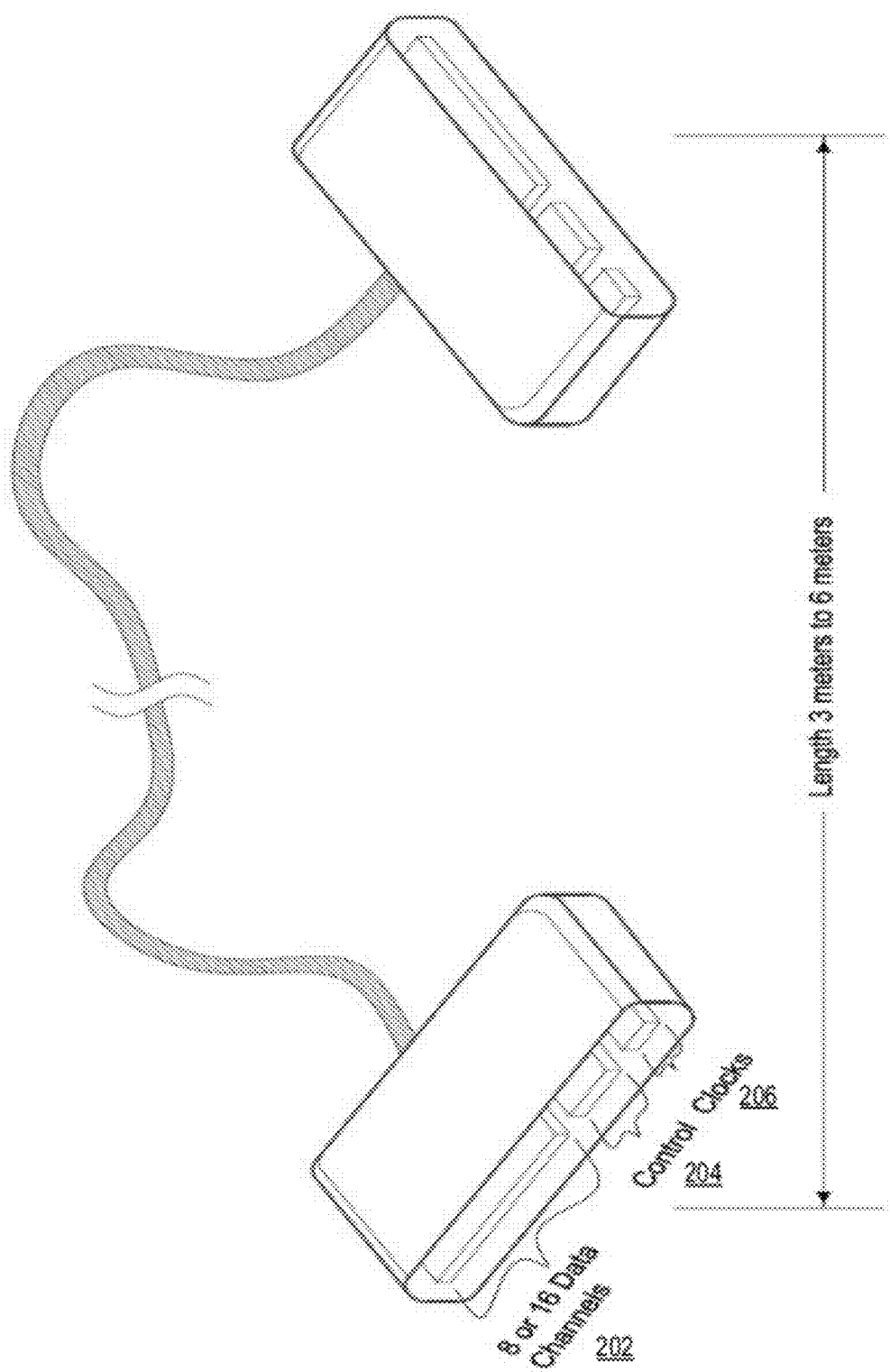
FIG. 2 sets forth a line drawing of an example of a network cable useful in systems that synchronize clock signals according to embodiments of the present invention.

For further explanation of network cables, FIG. 2 sets forth a line drawing of an example of a network cable useful in systems that synchronize clock signals according to embodiments of the present invention. The example cable of FIG. 2 includes a multiplicity of lines implementing data channels (202), control lines (204), and a number of clock lines (206) sufficient to support bidirectional communications of clock signals among computers in a network. Again, the particular arrangement of signal lines in the example cable of FIG. 2 is only for explanation, not a limitation of the invention. Cables for use in networks that synchronize clock signals according to embodiments of the present invention may contain any number of signals lines as may occur to those of skill in the art.

Figure 3:
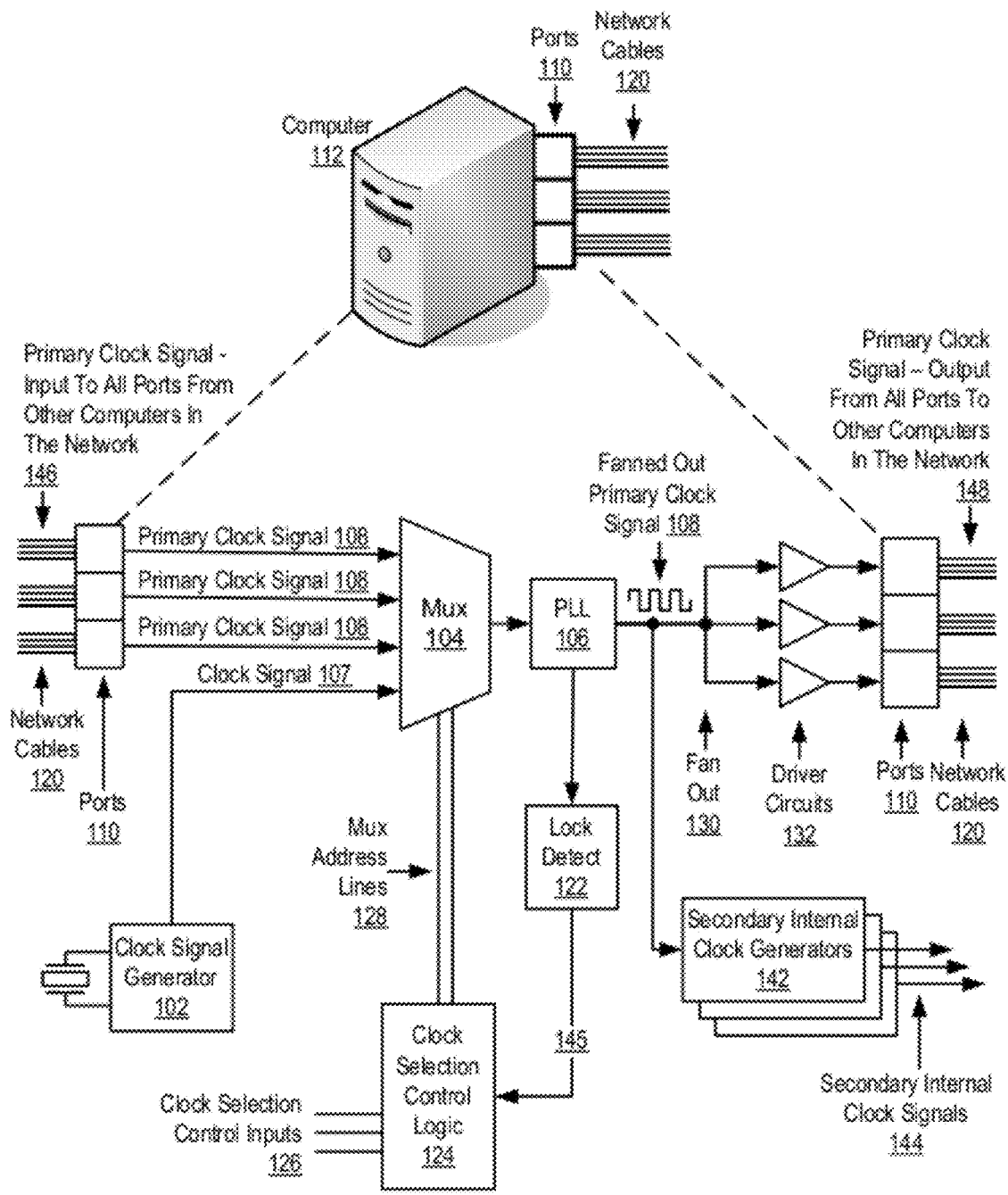
FIG. 3 sets forth a line drawing of an example circuit containing a clock signal generator, a multiplexer, and a narrow-bandwidth PLL useful for clock signal synchronization according to embodiments of the present invention.

For further explanation, FIG. 3 sets forth a line drawing of an example circuit containing a clock signal generator (102), a multiplexer (104), and a narrow-bandwidth PLL (106) useful for clock signal synchronization according to embodiments of the present invention. FIG. 3 presents a blown-up illustration of a circuit for a clock signal generator (102), a multiplexer (104), and a narrow-bandwidth PLL (106)—expanded from within a computer (112). Computer (112) is connected in a network with other computers through bidirectional data communications ports (110) and network cables (120), with a primary clock signal from the other computers present as an input to all its ports (146), all as illustrated in FIG. 1 and discussed above with regard to the example system of FIG. 1.

The clock signal generator (102) in this example is represented as a stable, high speed, crystal oscillator that may operate at any design frequency as will occur to those of skill in the art. Depending on the application, the clock signal generator may operate, for example, at megahertz frequencies, hundreds of megahertz, or even gigahertz, as will occur to those of skill in the art. The output from the clock signal generator (102) is connected to an input of the multiplexer (104). The other inputs to multiplexer (104) receive the primary clock signal (108) from other computers in the network (146).

The circuit of FIG. 3 includes clock selection control logic (124) that controls the multiplexer's (104) selection of an instance of the primary clock signal through multiplexer address lines (128). The clock selection control logic accepts control signals (126) from, for example, an operating system or BIOS, as well as an indication (145) of loss of lock from lock detection circuit (122). Clock selection control logic (124) can be implemented as a complex programmable logic device ('CPLD'), programmable array logic (PAL), a field programmable gate array ('FPGA'), a microcontroller with embedded memory bearing a control program, a microprocessor coupled to computer memory bearing a control program, and in other ways that will occur to those of skill in the art.

Clock selection control logic (124) sets the multiplexer's address lines (128) to select the clock signal (107) from the clock signal generator (102) as the primary clock signal for connection to the narrow-bandwidth PLL (106) if computer (112) is the computer whose clock signal is designated as the primary clock signal. If computer (112) is not the computer whose clock signal is designated as the primary clock signal, the clock selection control logic sets the multiplexer's address lines (128) to select an instance of the primary clock signal (108) from one of the other multiplexer inputs as the primary clock signal for connection to the narrow-bandwidth PLL (106). That is, if computer (112) is not the computer whose clock signal is designated as the primary clock signal, the clock selection control logic sets the multiplexer's address lines (128) to select an instance of the primary clock signal (108) that is input from one of the other computers on the network (146) as the primary clock signal for connection to the narrow-bandwidth PLL (106).

If computer (112) is the computer whose clock signal (107) is designated as the primary clock signal to all the other computers in the network, then the circuit of FIG. 3 operates to provide the primary clock signal, simultaneously and in parallel, from computer (112) to all the other computers in the network with computer (112) by fanning out (130) the primary clock signal from an output of the multiplexer (104) through the PLL (106) through a multiplicity of driver circuits (132) and cable conductors (120), one driver circuit driving each such cable conductor with a fanned out primary clock signal (108), each driven cable conductor connected from computer (112) to a separate one of the other computers in the network. The separate, or point-to-point, nature of the connections among the computers in the network is illustrated by the interconnections shown on FIG. 1, where each network cable (120) connects only from one port of a computer to one port of another computer in the network.

The circuit of FIG. 3 operates to provide the primary clock signal, simultaneously and in parallel, from each computer in the network to all computers in the network through the multiplexers and the PLLs, with the primary clock signal locked in phase across all the computers by a PLL on each computer. If computer (112) is the computer whose clock signal (107) is designated as the primary clock signal to all the other computers in the network, then the circuit of FIG. 3 fans out its clock signal (107) as the primary clock signal for the network as described just above. If computer (112) is not the computer whose clock signal (107) is designated as the primary clock signal to all the other computers in the network, then the circuit of FIG. 3 operates by fanning out (130) the primary clock signal (108) from an output of the multiplexer (104) on each computer in the network through the PLL (106) on each computer in the network through a multiplicity of driver circuits (132) and cable conductors (120), one driver circuit driving each such cable conductor with a fanned out primary clock signal (108), each driven cable conductor connected from each computer in the network to a separate one of the other computers in the network. Again, the separate, or point-to-point, nature of the connections among the computers in the network is illustrated by the interconnections shown on FIG. 1, where each network cable (120) connects only from one port of a computer to one port of another computer in the network.

In addition to connecting the primary clock signal (108) from the PLL (106) to driver circuits and to the network cables, the circuit of FIG. 3 also connects the primary clock signal to one or more secondary internal clock generators (142). The secondary internal clock generators are themselves typically implemented with PLLs that synchronize secondary internal clock signals (144) at various speeds with the primary clock signal—so that all the clock signals in the entire network of computers for which such synchronization is desired are capable of running in synchronization with the primary clock signal—and therefore with one another.

In operation of the circuit of FIG. 3, computer (112) may receive the primary clock signal from a second computer in the network. Lock detection circuit (122) may detect a loss of lock on the primary clock signal. Lock detection circuit (122) signals (145) the clock selection control logic (124) of any such loss of lock by the phase locked loop (106). The clock selection control logic (124), when advised of a loss of lock, switches the multiplexer address lines to receive the primary clock signal from a third computer in the network. The phased lock loop (106) then relocks on the primary clock signal (108) as received from the third computer. If the second computer is the computer whose clock signal is designated as the primary clock signal, then the clock selection control logic (124) designates as the primary clock signal a clock signal from one of the other computers in the network, that is, from a computer other than the one that was providing the primary clock signal when the lock was lost. After all, one of the reasons that the lock was lost can be that the computer that was providing the primary clock signal when lock was lost has failed catastrophically.

Figure 4:
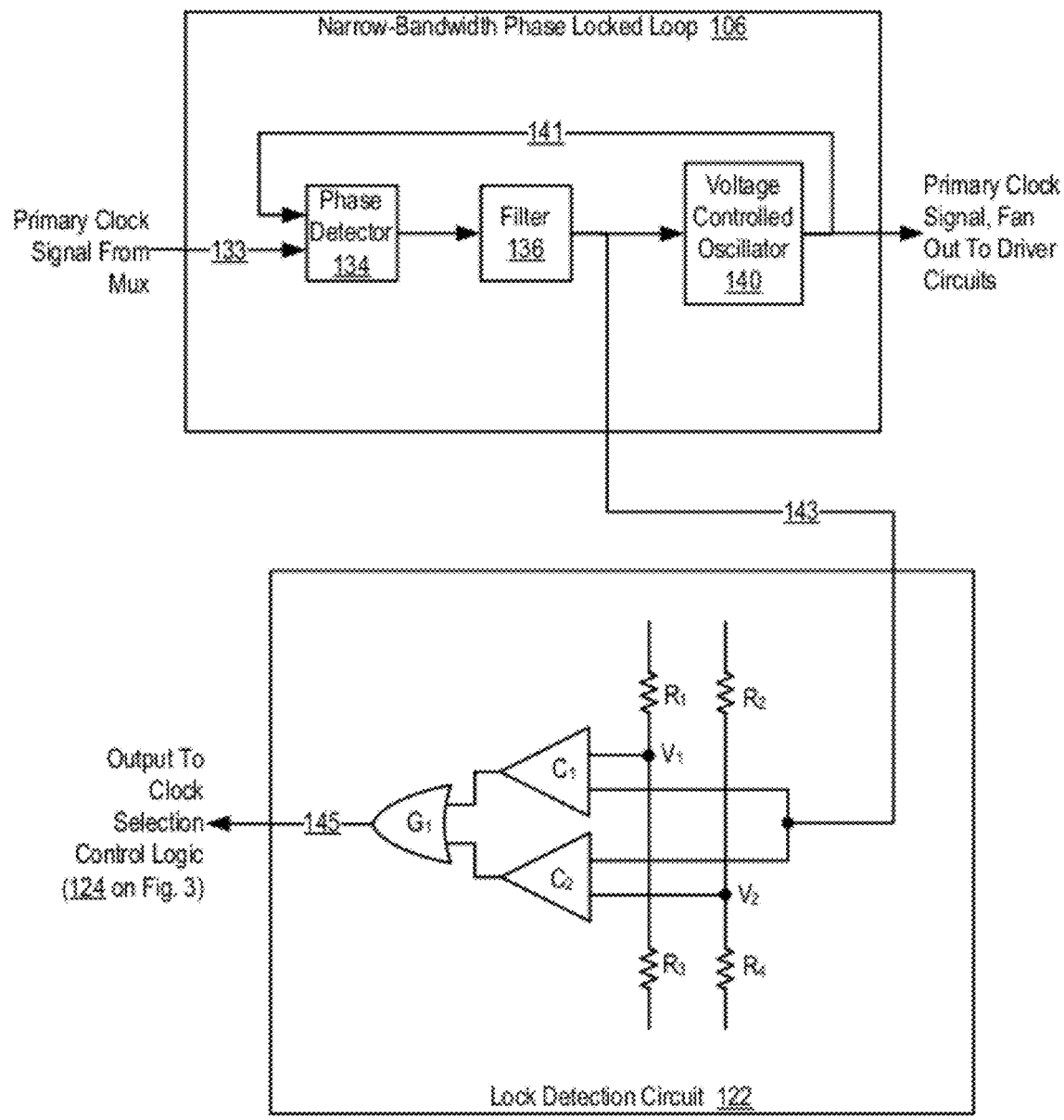
FIG. 4 sets forth a line drawing of an example circuit for a narrow-bandwidth PLL and an example circuit for lock detection useful in clock signal synchronization according to embodiments of the present invention.

For further explanation, FIG. 4 sets forth a line drawing of an example circuit for a narrow-bandwidth PLL (106) and an example circuit (122) for lock detection useful in clock signal synchronization according to embodiments of the present invention. The circuits of FIG. 4 are examples of a PLL and a lock detection circuit useful in computers that synchronize clock signals among computers in a network according to embodiments of the present invention. The PLL (106) of FIG. 4 includes a phase detector (134), a loop filter (136), and a voltage controlled oscillator ('VCO') (140). The phase detector has inputs of an instance of the primary clock signal from a multiplexer (133) and a feedback instance (141) of the primary clock signal from the output of the VCO (140), which is also the output of the PLL (106). The frequencies of both signal typically are the same. The output of the phase detector is a control voltage proportional to the phase difference between the two input signals—plus some additional higher frequency products that are removed by the loop filter (136) before the control voltage is applied to the VCO (140).

The loop filter is designed to match the characteristics required by the application of the PLL. If the PLL is to acquire and track a signal the bandwidth of the loop filter will be greater than if it expects a fixed input frequency. The frequency range which the PLL will accept and lock on is called the capture range. Once the PLL is locked and tracking a signal the range of frequencies that the PLL will follow is called the tracking range. Generally the tracking range is larger than the capture range. The loop filter also determines how fast the signal frequency can change and still maintain lock. This is the maximum slewing rate. The narrower the loop filter bandwidth the smaller the achievable phase error. This comes at the expense of slower response and reduced capture range.

In the example of FIG. 4, however, slow response is desirable, and reduced capture range is acceptable. The bandwidth of the PLL is set to a low value, typically 1 to 10 hertz, by setting the bandwidth of the loop filter to a low value, typically 1 to 10 hertz. Thus if the PLL loses lock on the input from the multiplexer, clock selection control logic (124 on FIG. 3) can restore the input to the PLL by switching the upstream multiplexer (104 on FIG. 3) to provide another instance of the primary clock signal from another computer in the network. In the meantime, after the loss of lock but before the clock selection control logic replaces the input primary clock signal, the output of the PLL with its narrow bandwidth shall have drifted so minutely in phase from its original locked value that none of the downstream logic or other devices are affected at all in their synchronous operations that depend on the synchronized output of the PLL—including secondary internal clock signals within other computers in the network. The PLL will regain lock on the new input primary clock signal, and none of the components that rely on the output of the PLL for synchronous operations will ever know that the lock was lost.

The lock detection circuit (122) accepts as its input the control voltage output (143) from the loop filter (136) in the PLL (106). The control voltage varies over a narrow range of voltages when the PLL is locked. A network of resistors, $R_1$, $R_2$, $R_3$, and $R_4$, define voltages $V_1$ and $V_2$ on inputs of comparators $C_1$ and $C_2$ so that $V_1$ and $V_2$ bracket the narrow range of voltages over which the control voltage varies when the PLL is locked. Comparators $C_1$ and $C_2$ signal logical OR gate $G_1$ when the control voltage moves outside its lock range. Gate $G_1$ signals (145) the clock selection control logic (124 on FIG. 3) of any loss of lock by the PLL (106).

Clock signal synchronization among computers in a network according to embodiments of the present invention is generally implemented with computers, that is, with automated computing machinery. In the system of FIG. 1, all of the principal components of the system are implemented to some extent at least as computers. For further explanation, therefore, FIG. 5 sets forth a block diagram of automated computing machinery comprising an exemplary computer (152) useful in clock signal synchronization among computers in a network according to embodiments of the present invention. The computer (152) of FIG. 5 includes at least one computer processor (156) or 'CPU' as well as random access memory (168) ('RAM') which is connected through a high speed memory bus (166) and bus adapter (158) to processor (156) and to other components of the computer.

Figure 5:
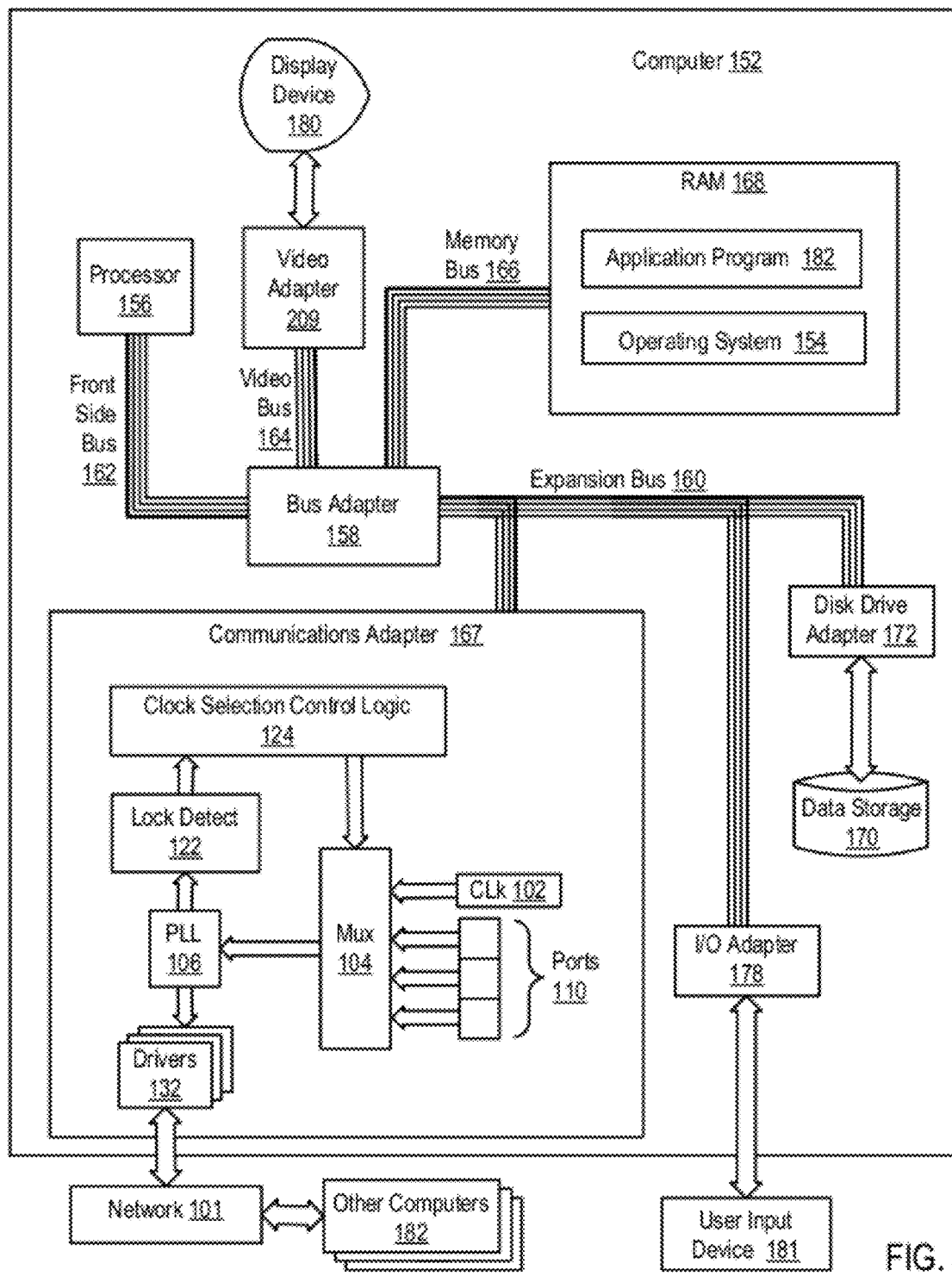
FIG. 5 sets forth a line drawing of an example circuit for a narrow-bandwidth PLL and an example circuit for lock detection useful in clock signal synchronization according to embodiments of the present invention.

Stored in RAM in the example of FIG. 5 is an application program (182), a module of computer program instructions that is used for a specific user-oriented task such as word processing, page layout in desktop publishing, or electronic illustrating, spreadsheets, database management, a web browser, and so on—all are examples of application programs. Also stored in RAM, in the example of FIG. 5, is an operating system (154). Operating systems useful in computers that synchronize a clock signal among computers in a network according to embodiments of the present invention include UNIX™, Linux™, Microsoft NT™, AIX™, IBM's i5/OS™, and others as will occur to those of skill in the art. The operating system (154) and the application program (182) in the example of FIG. 5 are illustrated disposed in RAM (168), but many components of such software typically are stored in non-volatile memory also, for example, on a disk drive (170).

The computer (152) of FIG. 5 includes a bus adapter (158), a computer hardware component that contains drive electronics for the high speed buses, the front side bus (162), the video bus (164), and the memory bus (166), as well as drive electronics for the slower expansion bus (160). Examples of bus adapters useful in computers according to embodiments of the present invention include the Intel Northbridge, the Intel Memory Controller Hub, the Intel Southbridge, and the Intel I/O Controller Hub. Examples of expansion buses useful in computers according to embodiments of the present invention include Industry Standard Architecture ('ISA') buses and Peripheral Component Interconnect ('PCI') buses.

The computer (152) of FIG. 5 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in such computers include Integrated Drive Electronics ('IDE') adapters, Small Computer System Interface ('SCSI') adapters, and others as will occur to those of skill in the art. In addition, non-volatile computer memory may be implemented for such a computer as an optical disk drive, electrically erasable programmable read-only memory (so-called 'EEPROM' or 'Flash' memory), RAM drives, and so on, as will occur to those of skill in the art.

The example computer (152) of FIG. 5 includes one or more input/output ('I/O') adapters (178). I/O adapters in computers implement user-oriented input/output through, for example, software drivers and computer hardware for controlling output to display devices such as computer display screens, as well as user input from user input devices (181) such as keyboards and mice. The example computer of FIG. 5 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 5 includes a communications adapter (167) for data communications with other computers (182) and for data communications with a data communications network (100). Such data communications may be carried out serially through RS-232 connections, through external buses such as a Universal Serial Bus (USW), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for clock signal synchronization among computers in a network according to embodiments of the present invention include modems for wired dial-up communications, Ethernet (IEEE 802.3) adapters for wired data communications network communications, and 802.11 adapters for wireless data communications network communications.

In this example, the communications adapter (167) includes a clock signal generator (102), data communications ports (110), a multiplexer (104), a PLL (106), clock selection control logic (124), a lock detection circuit (122), and signal line drivers (132), all of which operate as described above in this specification to synchronize a clock signal according to embodiments of the present invention. The clock selection control logic (124) operates the multiplexer (104) to select, depending upon whether the clock signal from the clock signal generator is designated as the primary clock signal for computers in a network, either the clock signal from the clock signal generator or an instance of the primary clock signal present from another computer on one of the data communications ports, to provide as the primary clock signal to the PLL (106). The PLL (106) locks on the primary clock signal and provides the primary clock signal through line drivers (132) and data communications network (101) to other computers (182) in the network. The PLL provides its VCO control voltage as a lock indicator to lock detection circuit (122) which in turn signals the clock selection control logic (124) of any loss of lock.

Figure 6:
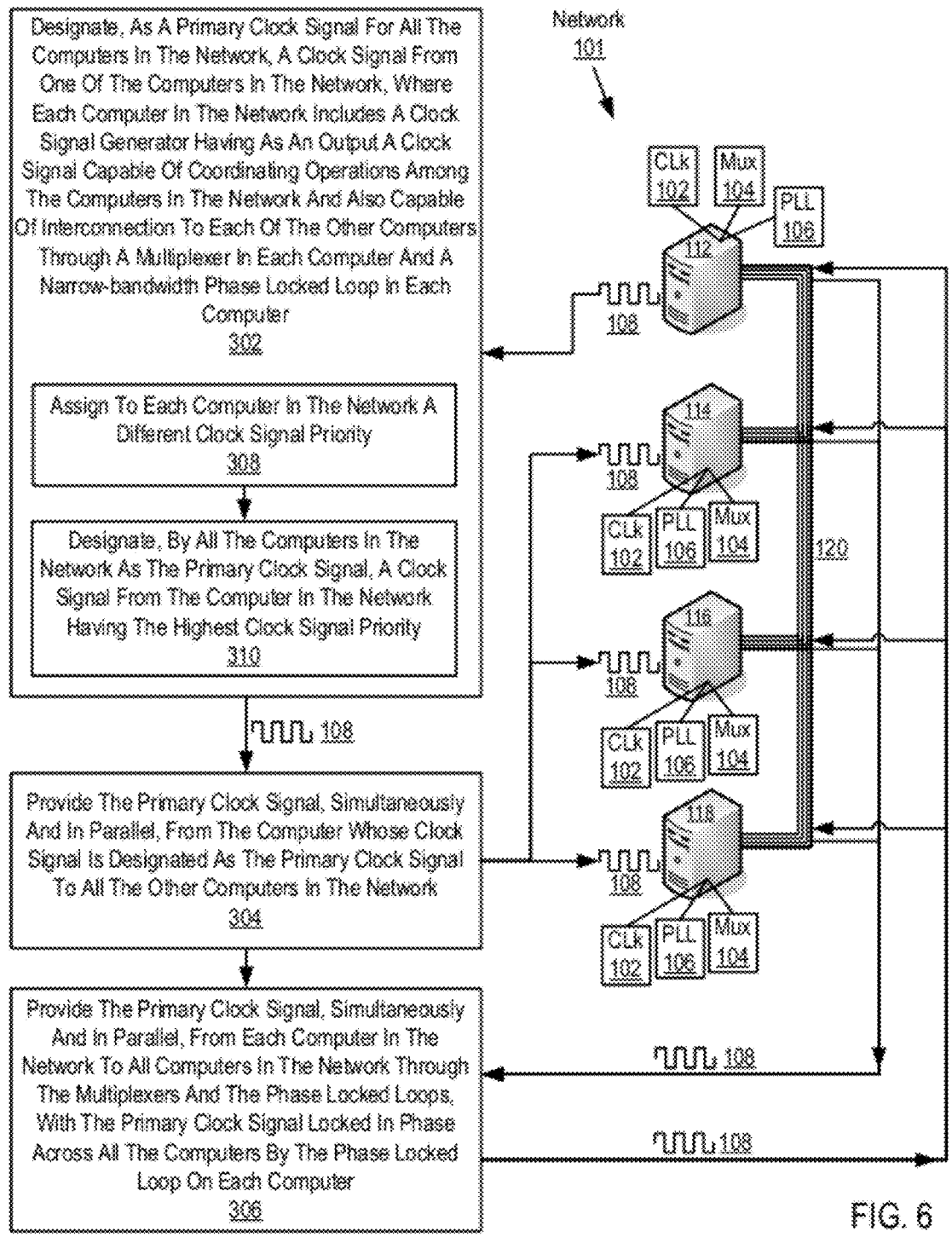
FIG. 6 sets forth a flow chart illustrating an exemplary method of clock signal synchronization among computers in a network according to embodiments of the present invention.

For further explanation, FIG. 6 sets forth a flow chart illustrating an exemplary method of clock signal synchronization among computers (112, 114, 116, 118) in a network (101) according to embodiments of the present invention that includes designating (302), as a primary clock signal (108) for all the computers (112, 114, 116, 118) in the network (101), a clock signal from one of the computers (112) in the network. The network (101) is composed of several computers (112, 114, 116, 118) coupled for data communications through network cabling (120), fabric switches, IP routers, or the like. Each computer (112, 114, 116, 118) in the network (101) includes a clock signal generator (102) having as an output a clock signal capable of coordinating operations among the computers in the network and also capable of interconnection to each of the other computers through a multiplexer (104) in each computer and a narrow-bandwidth PLL (106) in each computer. In the method of FIG. 6, each narrow-bandwidth PLL may have a loop bandwidth of, for example, at least 1 hertz and not more than 10 hertz.

In the method of FIG. 6, designating (302) a clock signal as a primary clock signal is carried out by assigning (308) to each computer in the network a different clock signal priority and by designating (310), by all the computers (112, 114, 116, 118) in the network (101) as the primary clock signal (108), a clock signal from the computer in the network having the highest clock signal priority. Such an assignment of priorities may be made by providing to each computer in the network a table similar to Table 1 below.

TABLE 1

Clock Signal Priorities

| Computer ID | Assigned Priority |
|---|---|
| 112 | 1 |
| 114 | 2 |
| 116 | 3 |
| 118 | 4 |

Each record in Table 1 represents an assignment of a priority to one of the computers (112, 114, 116, 118) in the network (101) of FIG. 6. Each priority is different, that is, separate and unique, no duplicated priority values. The priorities are represented by integers, with the lowest value integer representing the highest priority. At power up, therefore, or when operations is switched from asynchronous to synchronous, and the computers in the network therefore need to know which clock signal from which clock signal generator is to be designated the primary clock signal, each computer reads from Table 1 that the computer identified as computer (112) has the highest priority and each computer designates the clock signal from computer (112) as the primary clock signal. The clock selection control logic in computer (112) selects through the multiplexer in computer (112) the clock signal from the clock signal generator in computer (112) to be provided as the primary clock signal, and all the other computers' set their multiplexers to switch in a primary clock signal from one of their data communications ports.

This example of designating a primary clock source with a table made available to all computers in the network is not the only method of designating a primary clock signal within the scope of the present invention. In the discussion above regarding the system of FIG. 1, a primary clock signal was designated by user input through a user interface from a system console. Persons of skill in the art will think of other methods of designating a primary clock signal, and all such methods are well within the scope of the present invention.

The method of FIG. 6 also includes providing (304) the primary clock signal (108), simultaneously and in parallel, from the computer (112) whose clock signal is designated as the primary clock signal to all the other computers (114, 116, 118) in the network. The method of FIG. 6 also includes providing (306) the primary clock signal (108), simultaneously and in parallel, from each computer (112, 114, 116, 118) in the network to all computers (112, 114, 116, 118) in the network through the multiplexers (104) and the PLLs (106), with the primary clock signal (108) locked in phase across all the computers by the PLL on each computer.

Figure 7:
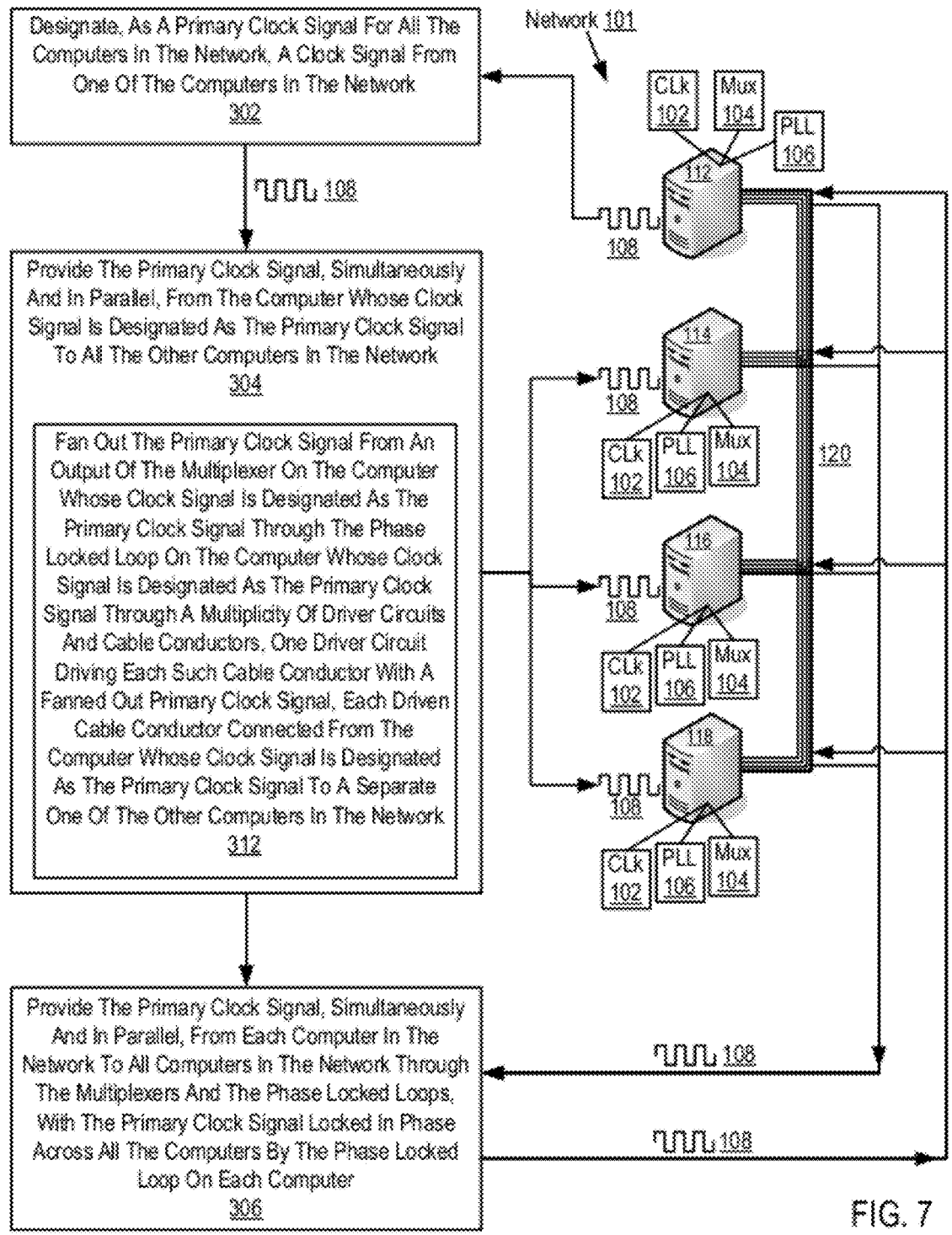
FIG. 7 sets forth a flow chart illustrating a further exemplary method of clock signal synchronization among computers in a network according to embodiments of the present invention.

For further explanation, FIG. 7 sets forth a flow chart illustrating a further exemplary method of clock signal synchronization among computers in a network according to embodiments of the present invention. The method of FIG. 7 is similar to the method of FIG. 6, including as it does designating (302) a primary clock signal, providing (304) the primary clock signal to all the other computers in the network, and providing (306) the primary clock signal from each computer in the network to all computers in the network through multiplexers and PLLs, all of which operate in a similar manner as described above in this specification. In the method of FIG. 7, however, providing (304) the primary clock signal, simultaneously and in parallel, from the computer (112) whose clock signal is designated as the primary clock signal to all the other computers (114, 116, 118) in the network (101) includes fanning out (312) the primary clock signal from an output of the multiplexer (104) on the computer (112) whose clock signal is designated as the primary clock signal through the PLL (106) on the computer (112) whose clock signal is designated as the primary clock signal through a multiplicity of driver circuits (132 on FIG. 3) and cable conductors (120), one driver circuit driving each such cable conductor with a fanned out primary clock signal, each driven cable conductor connected from the computer (112) whose clock signal is designated as the primary clock signal (108) to a separate one of the other computers (114, 116, 118) in the network (101).

Figure 8:
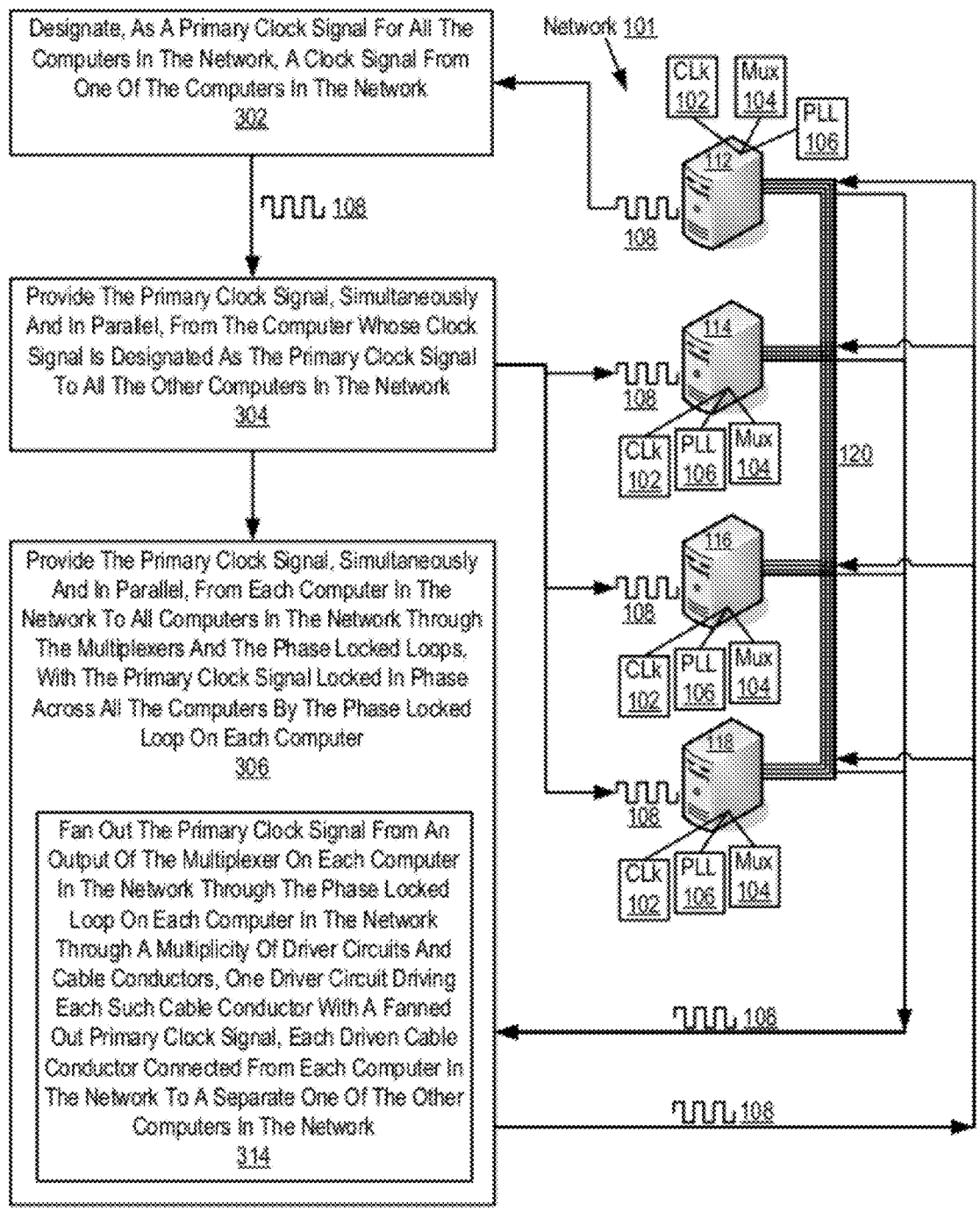
FIG. 8 sets forth a flow chart illustrating a further exemplary method of clock signal synchronization among computers in a network according to embodiments of the present invention.

For further explanation, FIG. 8 sets forth a flow chart illustrating a further exemplary method of clock signal synchronization among computers in a network according to embodiments of the present invention. The method of FIG. 8 is similar to the method of FIG. 6, including as it does designating (302) a primary clock signal, providing (304) the primary clock signal to all the other computers in the network, and providing (306) the primary clock signal from each computer in the network to all computers in the network through multiplexers and PLLs, all of which operate in a similar manner as described above in this specification. In the method of FIG. 8, however, providing (306) the primary clock signal (108), simultaneously and in parallel, from each computer (112, 114, 116, 118) in the network to all computers (112, 114, 116, 118) in the network through the multiplexers (104) and the PLLs (106), with the primary clock signal locked in phase across all the computers by a PLL on each computer, includes fanning out (314) the primary clock signal (108) from an output of the multiplexer (104) on each computer (112, 114, 116, 118) in the network (101) through the PLL (106) on each computer (112, 114, 116, 118) in the network (101) through a multiplicity of driver circuits (132 on FIG. 3) and cable conductors (120), one driver circuit driving each such cable conductor with a fanned out primary clock signal, each driven cable conductor connected from each computer in the network to a separate one of the other computers in the network.

Figure 9:
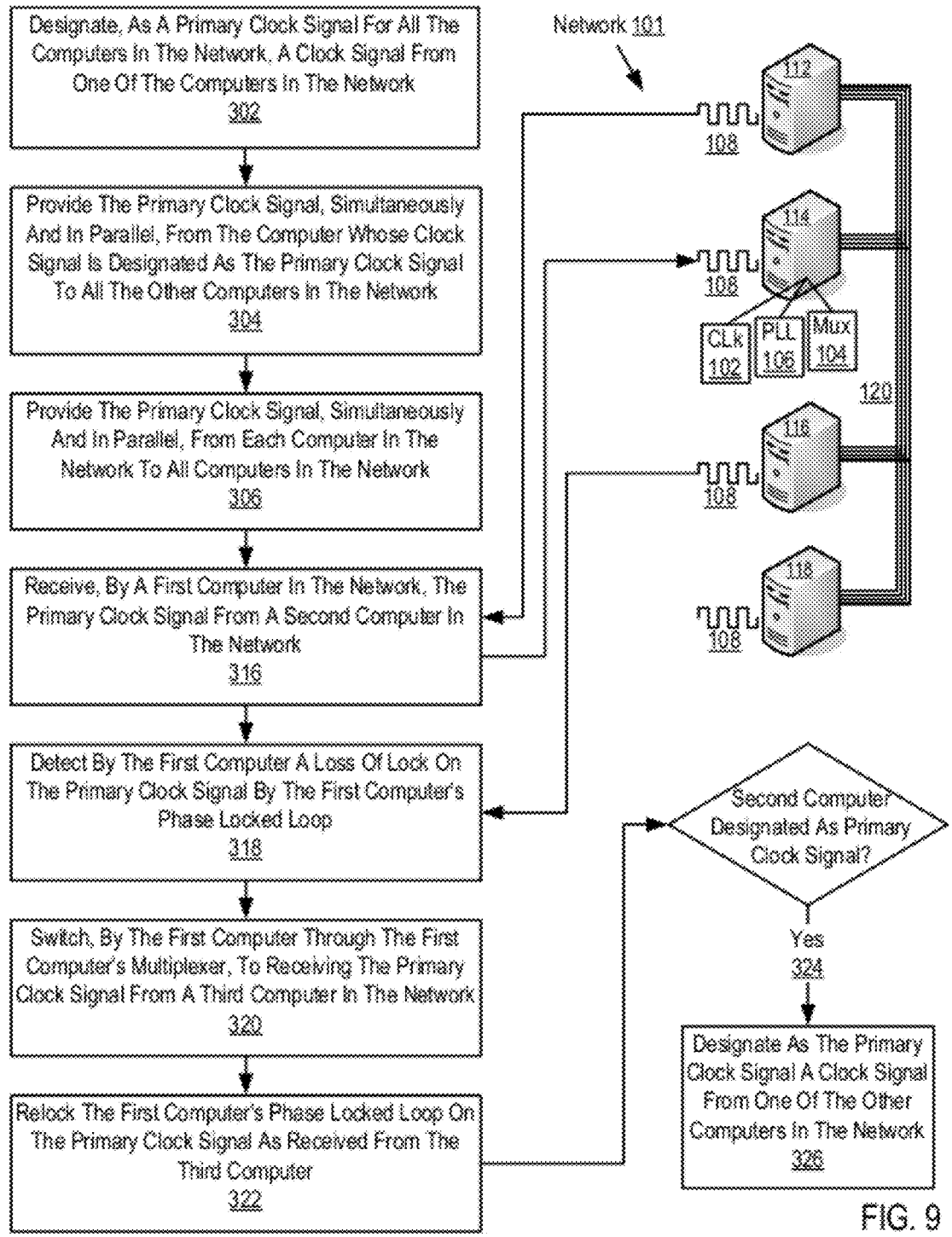
FIG. 9 sets forth a flow chart illustrating a further exemplary method of clock signal synchronization among computers in a network according to embodiments of the present invention.

For further explanation, FIG. 9 sets forth a flow chart illustrating a further exemplary method of clock signal synchronization among computers in a network according to embodiments of the present invention. The method of FIG. 9 is similar to the method of FIG. 6, including as it does designating (302) a primary clock signal, providing (304) the primary clock signal to all the other computers in the network, and providing (306) the primary clock signal from each computer in the network to all computers in the network through multiplexers and PLLs, all of which operates in a similar manner as described above with regard to the method of FIG. 6.

The method of FIG. 9, however, also includes receiving (316), by a first computer (114) in the network, the primary clock signal (108) from a second computer (112) in the network. The second computer (112), the one sending the primary clock signal, may or may not be the computer whose clock signal is designated as the primary clock signal. Either way, the first computer (114) receives an instance of the primary clock signal (108) from the second computer (112), as do all the computers in the network. And all instances of the primary clock signal throughout the network are synchronized by the PLLs in the computers in the network.

The method of FIG. 9 also includes detecting (318) by the first computer (114) a loss of lock on the primary clock signal by the first computer's PLL (104). A common cause of such a loss of lock is a failure of some kind in the second computer. Other causes can include signal attenuation from a defect in network cables, excessive network noise, and other causes as may occur to those of skill in the art. The lock loss may be detected by use of circuitry similar to that illustrated and discussed above with regard to reference (122) on FIG. 4.

The method of FIG. 9 also includes switching (320), by the first computer (114) through the first computer's multiplexer (104), to receiving the primary clock signal from a third computer (116) in the network. Such switching may be carried out by use of clock selection control logic similar to that illustrated and discussed above with regard to reference (124) on FIG. 3.

The method of FIG. 9 also includes relocking (322) the first computer's PLL (106) on the primary clock signal (108) as received from the third computer (116). Such relock is reliable when clock selection control logic quickly switches a multiplexer to provide an instance of the primary clock signal from one the other inputs of the multiplexer. All instances of the primary clock signal are phase locked in phase and on frequency. So the new instance of the primary clock now provided to the PLL in the computer that detected the loss of lock is practically identical the signal that was lost. Relock occurs quickly, and, because the PLL is narrow-bandwidth, its output phase and frequency drifted very little during the transition—not even noticeable to downstream components that rely on the output of the PLL for their primary clock signals.

If, in the method of FIG. 9, the second computer (112) is the computer whose clock signal is designated as the primary clock signal (324), then the method also includes designating (326) as the primary clock signal a clock signal from one of the other computers in the network. The first computer is aware, for example, through a data structure similar to Table 1, which computer is designated to originate the primary clock signal. If the second computer is the computer whose clock signal is designated as the primary clock, then its failure cuts off all the computers in the network from the stabilizing influence of the primary clock signal. Now all the PLLs in the system are slowly drifting away from the lock phase based on the primary clock signal from its designated source. This is why the method of FIG. 9 includes designating (326) as the primary clock signal a clock signal from one of the other computers in the network when it is determined (324) that the second computer (112), the one sending the primary clock signal to the first computer (114), is the computer whose clock signal is designated as the primary clock signal.

In view of the explanations set forth in this specification, readers will appreciate that the advantages of clock signal synchronization according to embodiments of the present invention include providing a scalable, multi-node single clock synchronization that allows for independent operation as well as single frequency operation across multiple nodes to enable a synchronous operation, thus reducing latency and increasing performance.

Exemplary embodiments of the present invention are described largely in the context of a fully functional computer system for clock signal synchronization among computers in a network. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
    designating an assigned priority for each computer in a network, wherein each computer in the network is directly connected to every other computer in the network via a plurality of direct data communications links, each direct data communications link coupling only two computers for data communications;
    identifying, using the assigned priority for each computer in the network, a primary clock signal for all the computers in the network;
    providing the primary clock signal, simultaneously and in parallel, from the computer whose clock signal is designated as the primary clock signal to all the other computers in the network via the direct data communications links between the computer whose clock signal is designated as the primary clock signal and all other computers in the network;
    providing the primary clock signal, simultaneously and in parallel, from each computer in the network to all other computers in the network via the direct data communications links between each computer in the network and all other computers in the network, with the primary clock signal locked in phase across all the computers;
    receiving, by a first computer in the network, the primary clock signal from a second computer in the network;
    detecting by the first computer a loss of lock on the primary clock signal by a first computer's phase locked loop; and
    switching, by the first computer through a multiplexer of the first computer, to receiving the primary clock signal from a third computer in the network.

2. The method of claim 1 wherein each computer has a narrow-bandwidth phase locked loop, wherein each narrow-bandwidth phase locked loop has a loop bandwidth of at least 1 hertz and not more than 10 hertz.

3. The method of claim 1 wherein designating a clock signal as a primary clock signal further comprises:
    assigning to each computer in the network a different clock signal priority; and
    designating, by all the computers in the network as the primary clock signal, a clock signal from the computer in the network having the highest clock signal priority.

4. The method of claim 1 wherein providing the primary clock signal, simultaneously and in parallel, from the computer whose clock signal is designated as the primary clock signal to all the other computers in the network further comprises:
    fanning out the primary clock signal from an output of the multiplexer on the computer whose clock signal is designated as the primary clock signal through a phase locked loop on the computer whose clock signal is designated as the primary clock signal through a multiplicity of driver circuits and cable conductors, one driver circuit driving each such cable conductor with a fanned out primary clock signal, each driven cable conductor connected from the computer whose clock signal is designated as the primary clock signal to a separate one of the other computers in the network.

5. The method of claim 1 wherein providing the primary clock signal, simultaneously and in parallel, from each computer in the network to all computers in the network, further comprises:
    fanning out the primary clock signal from an output of the multiplexer on each computer in the network through a phase locked loop on each computer in the network through a multiplicity of driver circuits and cable conductors, one driver circuit driving each such cable conductor with a fanned out primary clock signal, each driven cable conductor connected from each computer in the network to a separate one of the other computers in the network.

6. The method of claim 1 further comprising:
    relocking the first computer's phase locked loop on the primary clock signal as received from the third computer.

7. The method of claim 6 wherein:
    the second computer is the computer whose clock signal is designated as the primary clock signal; and
    the method further comprises designating as the primary clock signal a clock signal from one of the other computers in the network.

8. An apparatus comprising logic circuitry, the logic circuitry including a computer processor and a computer memory, the logic circuitry operating the apparatus to carry out the steps of:
    designating an assigned priority for each computer in a network, wherein each computer in the network is directly connected to every other computer in the network via a plurality of direct data communications links, each direct data communications link coupling only two computers for data communications;
    identifying, using the assigned priority for each computer in the network, a primary clock signal for all the computers in the network;
    providing the primary clock signal, simultaneously and in parallel, from the computer whose clock signal is designated as the primary clock signal to all the other computers in the network via the direct data communications links between the computer whose clock signal is designated as the primary clock signal and all other computers in the network;
    providing the primary clock signal, simultaneously and in parallel, from each computer in the network to all other computers in the network via the direct data communications links between each computer in the network and all other computers in the network, with the primary clock signal locked in phase across all the computers;
    receiving, by a first computer in the network, the primary clock signal from a second computer in the network;
    detecting by the first computer a loss of lock on the primary clock signal by a first computer's phase locked loop; and
    switching, by the first computer through a multiplexer of the first computer, to receiving the primary clock signal from a third computer in the network.

9. The apparatus of claim 8 wherein each computer has a narrow-bandwidth phase locked loop, wherein each narrow-bandwidth phase locked loop has a loop bandwidth of at least 1 hertz and not more than 10 hertz.

10. The apparatus of claim 8 wherein designating a clock signal as a primary clock signal further comprises:
assigning to each computer in the network a different clock signal priority; and
designating, by all the computers in the network as the primary clock signal, a clock signal from the computer in the network having the highest clock signal priority.

11. The apparatus of claim 8 wherein providing the primary clock signal, simultaneously and in parallel, from each computer in the network to all computers in the network, further comprises:
fanning out the primary clock signal from an output of the multiplexer on each computer in the network through a phase locked loop on each computer in the network through a multiplicity of driver circuits and cable conductors, one driver circuit driving each such cable conductor with a fanned out primary clock signal, each driven cable conductor connected from each computer in the network to a separate one of the other computers in the network.

12. The apparatus of claim 8 wherein providing the primary clock signal, simultaneously and in parallel, from each computer in the network to all computers in the network, with the primary clock signal locked in phase across all the computers, further comprises:
fanning out the primary clock signal from an output of the multiplexer on each computer in the network through a phase locked loop on each computer in the network through a multiplicity of driver circuits and cable conductors, one driver circuit driving each such cable conductor with a fanned out primary clock signal, each driven cable conductor connected from each computer in the network to a separate one of the other computers in the network.

13. The apparatus of claim 8 further comprising the logic circuitry operating the apparatus to carry out the steps of:
relocking the first computer's phase locked loop on the primary clock signal as received from the third computer.

14. The apparatus of claim 13 wherein:
the second computer is the computer whose clock signal is designated as the primary clock signal; and
the apparatus further comprises the logic circuitry operating the apparatus to carry out the step of designating as the primary clock signal a clock signal from one of the other computers in the network.

15. A computer program product embodied upon a computer-readable storage medium that is not a signal, the computer program product comprising computer program instructions capable of:
designating an assigned priority for each computer in a network, wherein each computer in the network is directly connected to every other computer in the network via a plurality of direct data communications links, each direct data communications link coupling only two computers for data communications;
identifying, using the assigned priority for each computer in the network, a primary clock signal for all the computers in the network;
providing the primary clock signal, simultaneously and in parallel, from the computer whose clock signal is designated as the primary clock signal to all the other computers in the network via the direct data communications links between the computer whose clock signal is designated as the primary clock signal and all other computers in the network;
providing the primary clock signal, simultaneously and in parallel, from each computer in the network to all other computers in the network via the direct data communications links between each computer in the network and all other computers in the network, with the primary clock signal locked in phase across all the computers;
receiving, by a first computer in the network, the primary clock signal from a second computer in the network;
detecting by the first computer a loss of lock on the primary clock signal by a first computer's phase locked loop; and
switching, by the first computer through the first computer's multiplexer, to receiving the primary clock signal from a third computer in the network.

16. The computer program product of claim 15 wherein the computer-readable storage medium comprises a recordable medium.

17. The computer program product of claim 15 wherein designating a clock signal as a primary clock signal further comprises:
assigning to each computer in the network a different clock signal priority; and
designating, by all the computers in the network as the primary clock signal, a clock signal from the computer in the network having the highest clock signal priority.

18. The computer program product of claim 15 further comprising instructions capable of:
relocking the first computer's phase locked loop on the primary clock signal as received from the third computer.

19. The computer program product of claim 18 wherein:
the second computer is the computer whose clock signal is designated as the primary clock signal; and
the computer program product further comprising instructions capable of designating as the primary clock signal a clock signal from one of the other computers in the network.

* * * * *